Feb. 20, 1968 MASAHISA MIYAGI 3,370,235

DUAL PILOT FREQUENCY-CORRECTING TERMINAL STATIONS FOR SATELLITE REPEATER SYSTEM

Filed Sept. 10, 1965 3 Sheets-Sheet 1

INVENTOR.
MASAHISA MIYAGI

BY

Hopgood & Calimafde

ATTORNEYS.

INVENTOR.
MASAHISA MIYAGI
BY
Hopgood & Calimafde
ATTORNEYS

INVENTOR.
MASAHISA MIYAGI
BY
Hopgood & Calimafde
ATTORNEYS

United States Patent Office 3,370,235
Patented Feb. 20, 1968

3,370,235

DUAL PILOT FREQUENCY-CORRECTING TERMINAL STATIONS FOR SATELLITE REPEATER SYSTEM

Masahisa Miyagi, Tokyo, Japan, assignor to Nippon Electric Company Limited, Tokyo, Japan, a corporation of Japan Filed Sept. 10, 1965, Ser. No. 486,372
Claims priority, application Japan, Sept. 11, 1964, 39/51,966
3 Claims. (Cl. 325—4)

This invention relates to communication between remote stations via a common repeater and in particular to a novel arrangement for ameliorating the effects of Doppler shift.

Doppler shift is prevalent in communication systems such as ionospheric scattering, and would occur in a similar manner in communication systems involving a plurality of ground-based stations communicating with one another via a common repeater disposed as a satellite in space. The frequency variation due to the Doppler phenomenon is inevitable with the relative motion of a satellite relay with respect to ground-based stations.

In the presence of Doppler shifts in a communication network of the foregoing type, the degradation in the frequency stability of the network due to variation in frequencies of radio waves arriving at the relay station is unavoidable no matter how stable the frequency of each ground-based station.

Accordingly, it is the object of this invention to provide a high performance communication network incorporating a plurality of ground based stations communicating with one another through a plurality of propagation paths via a common satellite repeater.

It is a further object of this invention to provide a communication network of the foregoing type which minimizes the adverse affect of Doppler shift at the common amplifier.

Briefly, the invention is predicated upon the concept that the intense beat tone, which is at times produced in a voice output when radio carrier telephone signals are transmitted under circumstances of Doppler shift, can be effectively eliminated by bringing the frequency variation due to the Doppler effect to the zero beat frequency or in the vicinity thereof by a suitable frequency control means. To do this in a system of the type described, a master ground station is designated and is provided with means for transmitting at least two pilot signals from a multi-frequency carrier source. Means are provided at each ground-based station for receiving the two pilot carriers emitted from the master station; and means are provided at each of the ground-based stations except the master station for transmitting at least two local pilot signals and receiving these two local pilot signals via the common repeater station through a loop propagation circuit. Further, means are provided at each slave station (each ground station but the master is termed "slave") for obtaining frequency information on the Doppler shift from the information possessed by the two pilot signals received from the master station and the information available from the transmission and reception of the two local pilot signals. Finally, means are provided at each slave station for controlling the single multi-frequency carrier source installed at each slave station with the frequency information regarding the Doppler shift so that the transmitting frequency may be controlled as a function thereof.

Whenever a common repeater station is shared by a plurality of ground-based stations having a plurality of carrier frequencies, it is inevitable that, because of the non-linearity of the repeater transmitter, a number of intermodulation products fall within the passband to become the cause of beat tone interference. It will be understood that this invention is most suitable in such cases.

The above mentioned and other features and objects of this invention and the manner of attaining them will become more apparent and the invention itself will best be understood by reference to the following description of an embodiment of the invention taken in conjunction with the accompanying drawings wherein:

FIGURE 1 schematically illustrates frequency variation due to Doppler effect.

FIGURE 2 shows the input vs. output gain characteristic of a repeater station transmitter.

FIGURE 3 graphically demonstrates the frequency variation due to Doppler effect.

Figure 1:
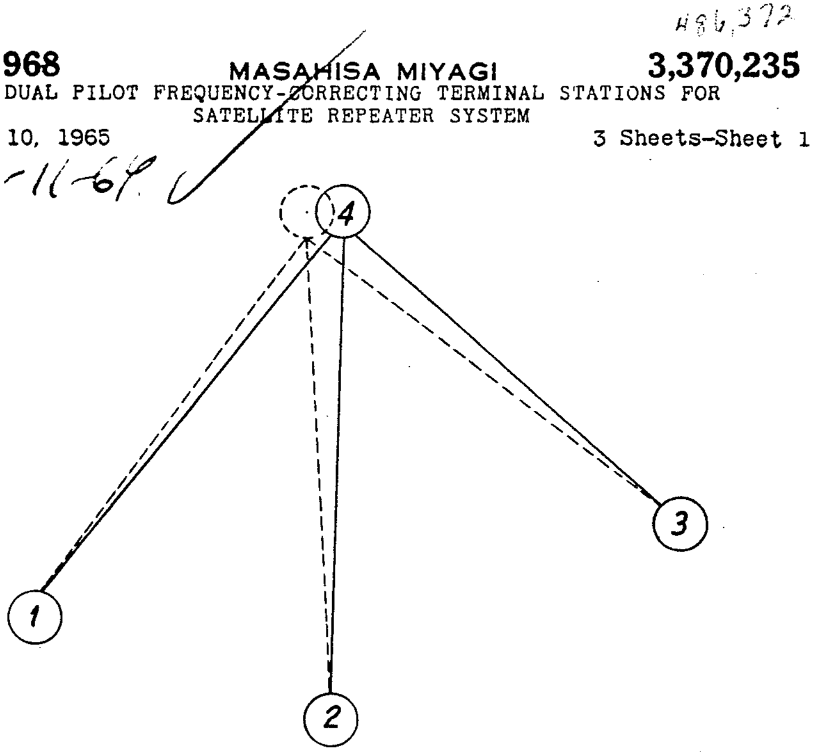

Turning now to FIG. 1, circles 1, 2 and 3 denote ground-based stations and circle 4 denotes a repeater station (radio relay) installed in a space communications satellite. In cases where the relative motion of the repeater station with respect to the ground-based stations varies with time, the occurrence of a frequency variation due to Doppler effect is inevitable. Since now the relative position of the repeater station 4 with respect to the ground-based stations 1, 2, and 3 are not the same, the Doppler shifts occurring in the propagation paths between these stations and the repeater station are unequal.

A more detailed analysis of Doppler phenomena in space communication may be found in a treatise entitled "Doppler Phenomena in Space Communications" by F. J. Tischer, IRE Transactions on Communication System, May 1959, pp. 25–30.

Figure 2:
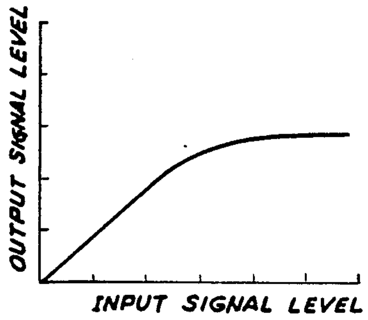

FIG. 2 shows the input vs. output gain characteristic of a repeater station transmitter; the input signal level and the output signal level being taken respectively as the abscissa and the ordinate. As may be seen, the functional relation becomes nonlinear above a certain level.

Figure 3:
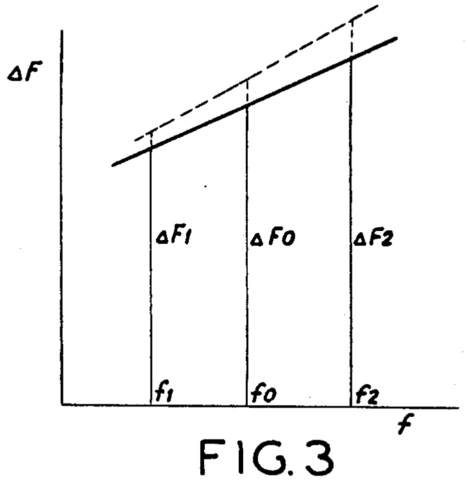

FIG. 3 shows the frequency variation due to Doppler effect; the multi-carrier frequency $f$ and the frequency variation $\Delta f$ of each carrier due to Doppler effect being taken, respectively, as the abscissa and ordinate. In the figure, $f_0$, $f_1$ and $f_2$ denote, respectively, the center frequency, the lower limit frequency, and the upper limit frequency of the passband; $\Delta F_0$, $\Delta F_1$, and $\Delta F_2$ denote the corresponding amounts of the Doppler frequency variation. As will be evident from FIG. 3, the Doppler shift varies in direct proportion to the carrier frequency. The dashed curve illustrates the Doppler variation in frequency for the same frequencies, but a different relative velocity of the repeater station with respect to the earth. In other words, the frequency variation within the passband due to the Doppler effect is not constant, but varies with changes in the relative position of the repeater station with respect to ground-based stations. However, the frequency variation is, as mentioned, approximately linearly related to the carrier frequency. Therefore $$\Delta F_2-\Delta F_1=2(\Delta F_0-\Delta F_1)$$

Figure 4:
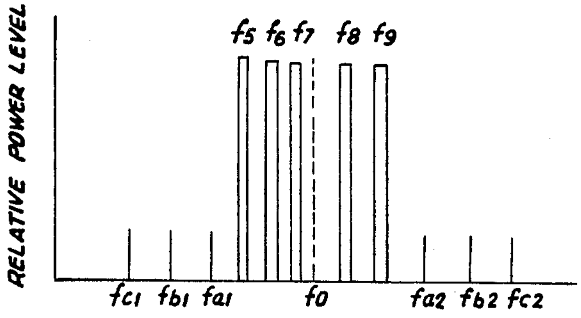
FIGURE 4 shows schematically one example of the frequency allocation of pilot signals and carriers to individual stations according to the invention.

FIG. 4 shows the frequency allocation of at least two pilot signals to each station according to the invention.

In the figure, the abscissa denotes the carrier frequency; $f_{a1}$ and $f_{a2}$ two pilot signal frequencies assigned the master station; $f_{b1}$ and $f_{b2}$ two pilot signal frequencies assigned another ground-based station, $f_{c1}$ and $f_{c2}$ two pilot signal frequencies assigned another ground-based station; $f_0$ the center frequency of the passband; and $f_5$ through $f_9$ multifrequency carriers assigned each ground-based station for communicating with any other station by the suitable selection of carriers. The ordinate denotes the relative power level. At this juncture it bears mentioning that it has been common practice to reduce the relative power level of the pilot signal below that of any carrier to minimize additional power loss.

If now carriers at the same frequency $f_0$ are emitted from a number of ground-based stations to equalize the Doppler frequency shifts at the center frequency $f_0$, station identification becomes impossible. If, on the other hand, the pilot signals of each station are allocated on both sides of $f_0$ so as to be equidistant therefrom in the manner shown in FIG. 4, the Doppler shift at $f_0$ can be determined for that station from the frequency information on the two pilot signals without using the center frequency $f_0$ (see equation infra). Thus station identification becomes easy if the pilot signal frequencies of one station are made different from those of any other station as shown.

Figures 5, 6:
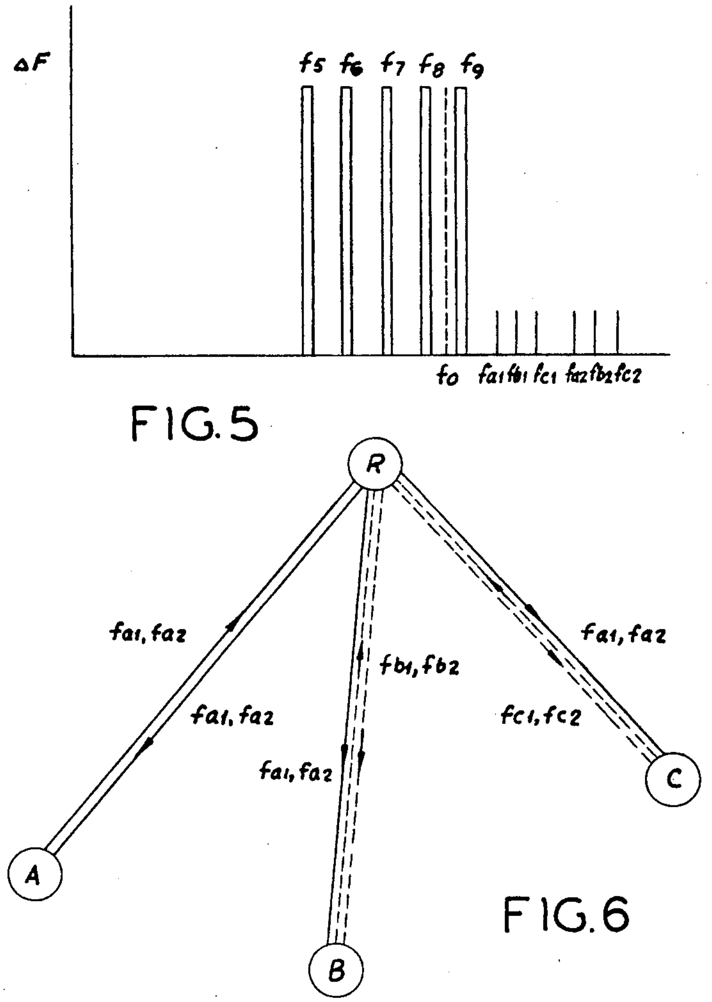
FIGURE 5 shows schematically another example of the allocation of pilot signals and carriers to individual stations according to the invention.
FIGURE 6 shows the pilot signal propagation paths and operational paths between stations for an embodiment of the invention.

FIG. 5 shows an alternative pilot signal arrangement. In contradistinction to FIG. 4, the pilot signals of each station shown in FIG. 5 are allocated on one side of $f_0$. Since, however, the carrier frequency is approximately linearly related to the Doppler shift, as may be seen from FIG. 3, the Doppler shift at the center frequency $f_0$ is available from the frequency information on the two pilot signals under consideration as before.

FIG. 6 illustrates the propagation paths of the pilot signals and the operational essentials for an embodiment of this invention. In this figure, A, B, and C denote ground-based communication stations and R denotes the satellite repeater station. To facilitate an understanding of this embodiment, it will be assumed that the repeater station contains frequency conversion type amplifiers.

Each of the ground-based stations A, B, and C will employ at least two pilot signals which have been allocated as shown in FIG. 4. (The FIG. 4 mode has been chosen for illustration.) Station A is taken as the master (reference) station, emitting at least two pilot signals at $f_{a1}$ and $f_{a2}$, preferably furnished from a single multifrequency oscillator. According to the invention, each of the ground-based stations A, B, and C receives the pilot signals $f_{a1}$ and $f_{a2}$ after performing frequency conversion of the two pilot signals in common to ensure that the frequency information possessed by the two pilot signals is not lost. In addition, slave stations B and C each emit and receive, via the repeater loop, at least two local pilot signals $f_{b1}$ and $f_{b2}$ and $f_{c1}$ and $f_{c2}$. As before, each of the pilot signal pairs $f_{b1}$ and $f_{b2}$ and $f_{c1}$ and $f_{c2}$ are preferably created by a single oscillator. Both the master pilot signals and the local pilot signals should be subjected to common frequency conversion, when received at a slave station, to avoid the introduction of erroneous information.

With this arrangement, station identification becomes simple because each ground-based station adopts pilot signals at frequencies differing from any other while the Doppler shift at $f_0$ is known without the center frequency $f_0$ even being used.

The principles of the invention will now be quantitatively analyzed with reference to FIG. 6 by mathematical formula.

Let the Doppler shift produced in interval A–R for $f_{a1}$ be denoted by $\alpha_{a1}$ and that in R–A by $\beta_{Aa1}$ while those for $f_{a2}$ be denoted respectively by $\alpha_{a2}$ and $\beta_{Aa2}$. Let it be further assumed that the frequency variation produced at the repeater station is ΔF; the receiving local oscillator frequency of station A is $f_{LA}$; the frequency converter output of station A is $F_A$; and $F_A$ for $f_{a1}$ is denoted by $F_{Aa1}$.

Then we have the following equations for station A:

$$f_{a1}+\alpha_{a1}-\Delta F+\beta_{Aa1}-f_{LA}=F_{Aa1}$$

$$f_{a2}+\alpha_{a2}-\Delta F+\beta_{Aa2}-f_{LA}=F_{Aa2}$$

In like manner, the following formulas result when pilot signals emitted from station A are received by station B:

$$f_{a1}+\alpha_{a1}-\Delta F+\beta_{Ba1}-f_{LB}=F_{Ba1}$$

$$f_{a2}-\alpha_{a2}-\Delta F+\beta_{Ba2}-f_{LB}=F_{Ba2}$$

When pilot signals at $f_{b1}$ and $f_{b2}$ are transmitted and received locally from and at station B, the following relation will be established:

$$f_{b1}+\alpha_{b1}-\Delta F+\beta_{Bb1}-f_{LB}=F_{Bb1}$$

$$f_{b2}+\alpha_{b2}-\Delta F+\beta_{Bb2}-f_{LB}=F_{Bb2}$$

Therefore the frequency differences between two pairs of pilot signals become respectively as follows:

$$F_{Ba1}-F_{Ba2}=(f_{a1}+\alpha_{a1}+\beta_{Ba1})-(f_{a2}+\alpha_{a2}+\beta_{Ba2})$$

$$F_{Bb1}-F_{Bb2}=(f_{b1}+\alpha_{b1}+\beta_{Bb1})-(f_{b2}+\alpha_{b2}+\beta_{Bb2})$$

Since the frequency variation due to the Doppler effect is linearly related to the carrier frequency as shown in FIG. 3, the following equations yield regarding the center frequency:

$$F_{Ba1}+\frac{F_{Ba1}-F_{Ba2}}{2}=f_{a1}+\frac{f_{a1}-f_{a2}}{2}-\Delta F-f_{LB}+(\alpha_{a1}+\beta_{Ba1})+\left(\frac{\alpha_{a1}+\beta_{Ba1}-\alpha_{a2}-\beta_{Ba2}}{2}\right)$$

$$F_{Bb1}+\frac{F_{Bb1}-F_{Bb2}}{2}=f_{b1}+\frac{f_{b1}-f_{b2}}{2}-\Delta F-f_{LB}+(\alpha_{b2}+\beta_{Ba2})+\left(\frac{\alpha_{b1}+\beta_{Bb1}-\alpha_{b2}-\beta_{Bb2}}{2}\right)$$

The left-hand terms of these equations denote respectively the output frequency of the receiving frequency converter at station B. When radio waves in the passband having the center frequency $f_0$ emitted from station A are received and the same when radio waves in the passband having the center frequency $f_0$ are locally emitted and received at station B.

Referring to the right-hand side terms of these equations, $$\beta_{Ba1}+\frac{\beta_{Ba1}-\beta_{Ba2}}{2}$$

should be equal to $$\beta_{Ba2}+\frac{\beta_{Bb1}-\beta_{Bb2}}{2}$$

because they represent the Doppler shifts at frequency $f_0$ in the identical interval R–B.

Therefore $$\left(F_{Ba1}+\frac{F_{Ba1}-F_{Ba2}}{2}\right)-\left(F_{Bb1}+\frac{F_{Bb1}-F_{Bb2}}{2}\right)=\alpha_{a1}+\left(\frac{\alpha_{a1}-\alpha_{a2}}{2}\right)-\alpha_{b2}-\left(\frac{\alpha_{b1}-\alpha_{b2}}{2}\right)$$

This corresponds to the difference in the Doppler shift between intervals A–R and B–R as referred to the center frequency $f_0$. By controlling the transmitting frequency (one of the carriers) so as to make this value zero at station B, it is possible to make the center frequency of the radio waves arriving at repeater station R coincident with the signal frequency from station A. In like manner, the transmitting frequency of station C may be controlled at station C by use of the two pilot signals emitted from station A and the local looped pilot signals.

If the frequencies of the signals received at the repeater station R from two different stations become equal irrespective of the amount of Doppler shift, it may be said that there are common paths between repeater station A and ground-based stations. Therefore, the receiving frequencies at the ground-based stations become equal. Therefore, the effect of the frequency variation of the entire communication system can be kept to a minimum by making the center frequencies ($f_0$) of all ground-based stations coincident at the repeater station R.

The principles of this invention will now be described with reference to a concrete example.

Figure 7:
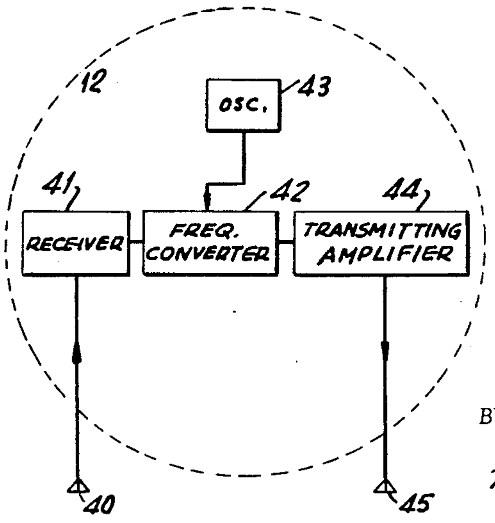
FIGURES 7, 8 and 9 are block diagrams of the satellite, a master, and a slave station respectively according to the invention.
Figure 8:
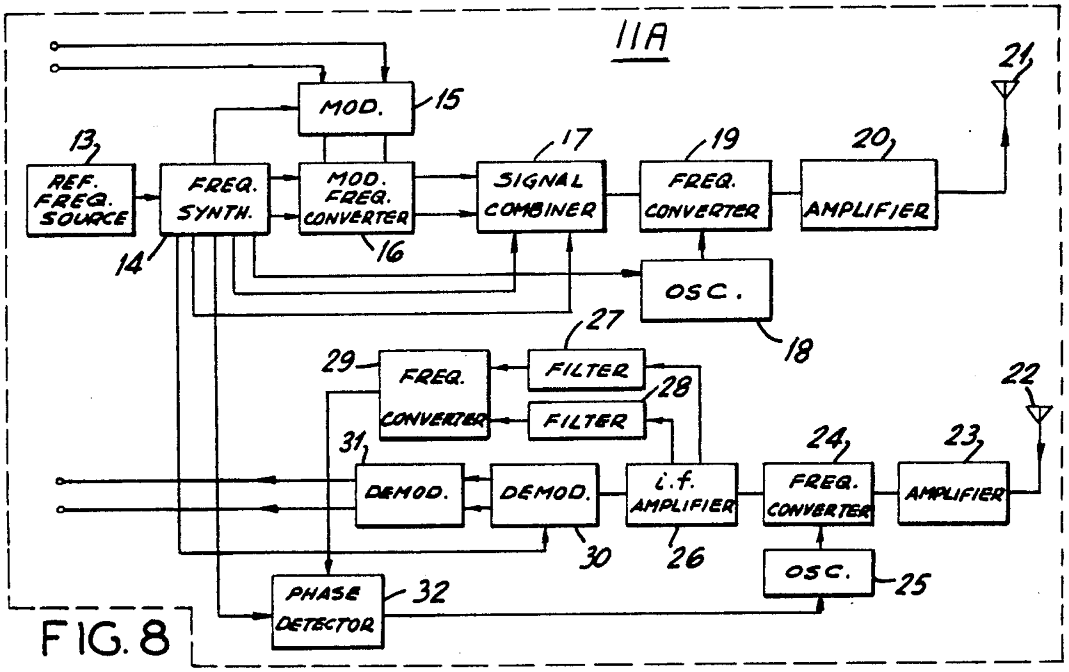
Figure 9:
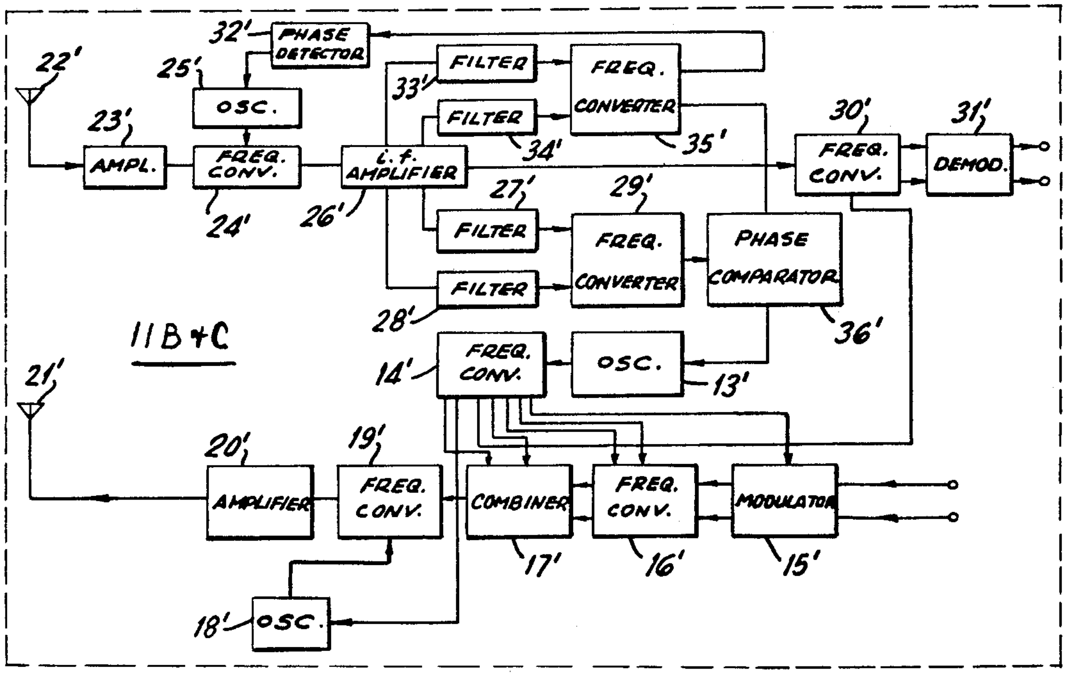

FIGS. 7 through 9 in combination illustrate an embodiment of a communication system according to this invention, wherein 11A, 11B, and 11C denote ground-based stations and 12 denotes a repeater station such as a radio relay mounted in a satellite. As a result of the relative motion of repeater station 12 with respect to ground-based stations 11A, 11B, and 11C, a frequency variation due to Doppler effect will be produced in the propagation paths as explained.

Station 11A, the "master," will be examined first. In the master, highly stable frequency source 13, which serves as a reference for the entire system, feeds the frequency synthesizer 14, whose multifrequency output is derived through frequency multiplication, division, etc. Voice signals, code, etc. are added to the multifrequency carriers by the modulator group 15 and modulating frequency converter group 16. The signals are then combined by circuit 17, frequency converted, and launched by the antenna 21 via the amplifier 20.

The frequency synthesizer furnishes the reference frequencies used for: the two pilot signals, the modulator group 15, the modulating frequency group 16, the transmitting local oscillator 18, and the AFC for the receiving local oscillator.

Signals from the satellite are received over the antenna 22, amplified and frequency converted by the associated circuits 23, 24, 25 and 26 and fed to the two band-pass filters 27 and 28 where the two pilot signals are extracted (having traveled the propagation loop), and fed to the frequency converter for deriving the frequency information. The output from circuit 29 is applied to phase detector 32 which applies automatic frequency control (AFC) to the receiving local oscillator 25. This automatic frequency control is effected to minimize the influence of the frequency variation of a communication network on band-pass filters 27 and 28. The demodulator group 31 demodulates the multifrequency carrier modulated signal from ground-based station 11B or 11C (via the satellite) to obtain a voice or code signal.

The ground based stations other than the master have the circuit structure shown in FIG. 9. There may be as many as ten or more than ten such stations; two have been chosen throughout the application as illustrative.

The slave station reference oscillator is circuit 13' which is controlled by the frequency information obtained from the data extracted from two pilot signals emitted from the master station and two looped local pilot signals. Frequency synthesizer 14' creates by multiplication, division, etc., the multifrequency carriers dependent upon the reference oscillator.

Upon reception, the local pilot signals are derived at the band pass filter 33' and 34' similarly and through similar circuits as was shown for the master. The local pilot signals are frequency converter (35') and phase detected to provide AFC for the receiving local oscillator 25'. Each slave station also extracts by virtue of band pass filters 27' and 28' the master pilot signals; the two sets of pilot signals being compared by the phase comparator 36' which controls the oscillator 13'.

The satellite repeater 12 is shown in FIG. 7 and consists essentially of the four parts delineated therein. As may be seen, the receiving frequency differs from the transmitting frequency by the frequency of the local oscillator 43.

Thus at least two pilot signals are emitted from the master ground station, and each of the slave stations receives these two pilot signals and also transmits at least two local pilot signals created by local reference oscillators (13') receiving these latter two pilot signals via the repeater station. By making a comparison between the frequency information possessed by the two pilot signals emitted from the master station 11A and the frequency information possessed by the two local looped pilot signals on the basis of the same frequency conversion, the difference in Doppler shift in the propagation paths between repeater station 12 and stations 11A, 11B, 11C etc. can be detected.

By applying the detected outputs to the reference oscillators (13') to control the transmitting frequencies, it is possible to bring the frequencies received at repeater station 12 in approximate coincidence.

While I have described above the principles of my invention in connection with specific apparatus, it is to be clearly understood that this description is made only by way of example and not as a limitation to the scope of my invention as set forth in the objects thereof and in the accompanying claims.

I claim:

1. In a communication network having a plurality of ground based stations, each including a multifrequency carrier source, and a satellite repeater, the improvement for ameliorating the effects of Doppler shift comprising: means at one ground based station for deriving from said multifrequency carrier source and transmitting from said station at least two pilot signals; means at each ground based station for receiving and extracting said pilot signals; means at each ground based station save said one for deriving from the respective multifrequency carrier sources and transmitting from said stations at least two local pilot signals; means at each ground based station save said one for receiving and extracting the local pilot signals transmitter therefrom and looped through said repeater; comparison means, at each ground based station save said one, coupled to said pilot signal receiving and extracting means for deriving information on the Doppler shift of said station's signal; and means coupled between said comparison means and said multifrequency carrier source for varying the output thereof to minimize the variation in frequencies appearing at the satellite repeater.

2. The improvement claimed in claim 1 wherein half the sum of each of said two pilot signals' frequency is the approximate center frequency of the associated multifrequency carrier source.

3. The improvement claimed in claim 1 in which said comparison is effected in a phase comparator.

References Cited

UNITED STATES PATENTS

| | | | |
|---|---|---|---|
| 3,144,606 | 8/1964 | Adams et al. | 325—4 |
| 3,201,692 | 8/1965 | Sichak et al. | 325—50 X |
| 3,263,173 | 7/1966 | Collins et al. | 325—17 X |

FOREIGN PATENTS

| | | |
|---|---|---|
| 636,467 | 5/1950 | Great Britain. |

JOHN W. CALDWELL, *Primary Examiner.*

B. V. SAFOUREK, *Assistant Examiner.*